UNITED STATES PATENT OFFICE.

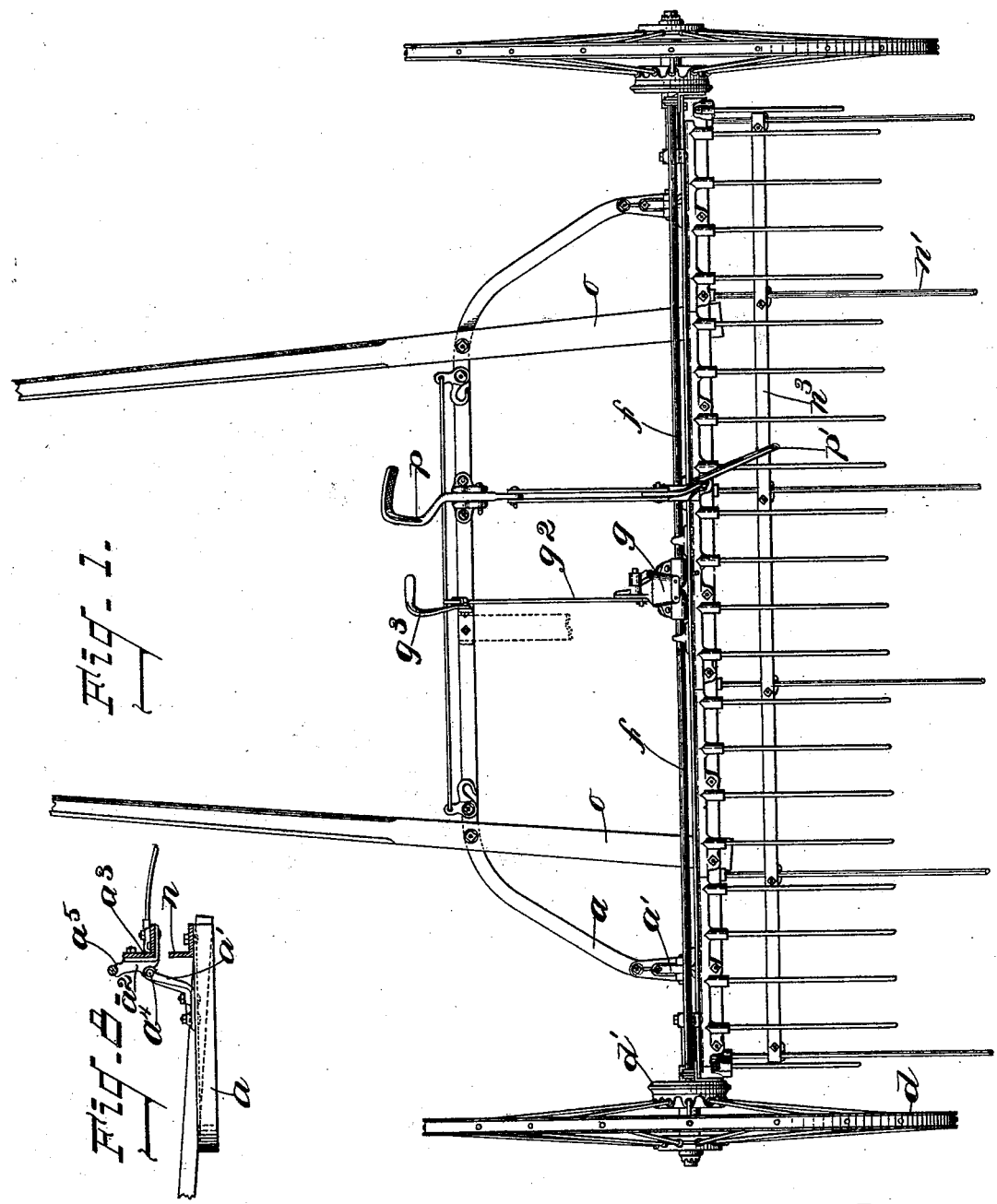

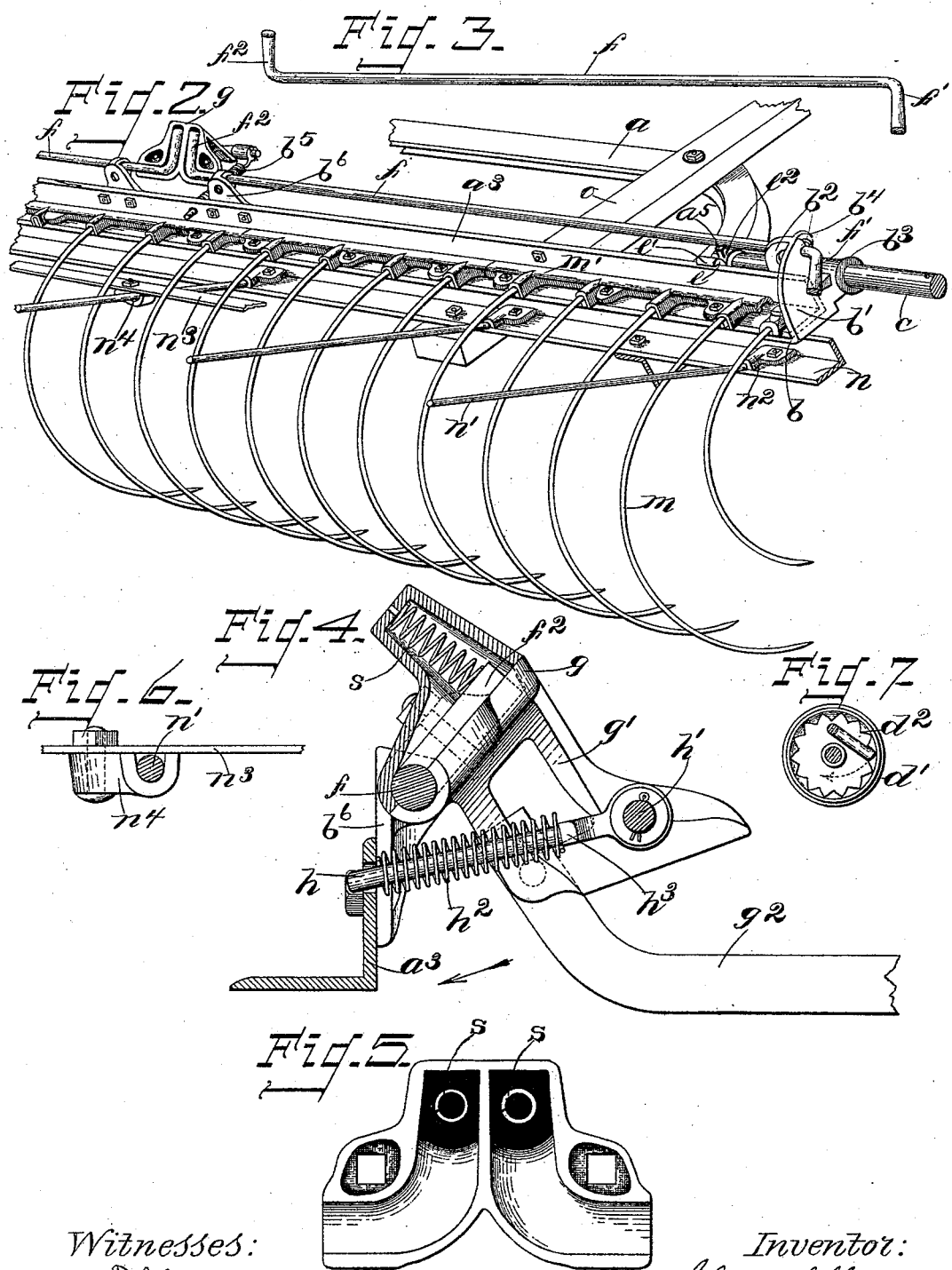

CHARLES S. SHARP, OF AUBURN, NEW YORK, ASSIGNOR TO THE D. M. OSBORNE & COMPANY, OF SAME PLACE.

HORSE-RAKE.

SPECIFICATION forming part of Letters Patent No. 517,491, dated April 3, 1894.

Application filed August 24, 1893. Serial No. 483,912. (No model.)

*To all whom it may concern:*

Be it known that I, CHARLES S. SHARP, of Auburn, county of Cayuga, State of New York, have invented an Improvement in Horse-Rakes, of which the following description, in connection with the accompanying drawings, is a specification, like letters on the drawings representing like parts.

This invention has for its object to improve the construction of self dumping hay rakes, being an improvement upon the rake shown and described in application for Letters Patent Serial No. 419,208.

The invention has reference to various improvements in the construction of the frame, and arrangement of the parts, also to the construction of the mechanism employed for raising the teeth, and to the tripping mechanism therefor.

Figure 1, shows in plan view a self dumping hay rake embodying this invention; Fig. 2, a perspective view of a portion of the rake; Fig. 3, a detail of one of the rock shafts; Fig. 4, an enlarged sectional detail of the mechanism for operating the rock shaft; Fig. 5, a detail of a co-operative part of the mechanism shown in Fig. 4; Fig. 6, a sectional detail showing one of the strippers, and cross bar thereon; Fig. 7, a detail showing the internally toothed hub of one of the supporting wheels, and Fig. 8, a detail showing the hinge connection between the draft frame and rake head.

The draft frame $a$, is made bow-shaped as shown in Fig. 1, and consists of a bent angle iron bar inverted L-shaped in cross section so as to present at its upper side a broad flat face to which several parts, to be described, may be attached. Near each end of said draft frame an upwardly projecting block or casting $a'$ is bolted, having a bifurcated or other shaped end adapted to receive lugs or ears $a^2$, which are securely bolted to an angle iron bar $a^3$, L-shaped in cross section, pivot bolts $a^4$, passing through said bifurcated ends, and also through said lugs or ears $a^2$, to thereby hinge said bar $a^3$ to the draft frame $a$. The bar $a^3$ projects beyond the draft frame $a$ at each end, and has securely bolted to its ends like supporting blocks, each of which is herein shown as comprising three sides or faces, $b, b', b^2$, arranged at right angles with relation to each other, yet said supporting blocks may be made by omitting the sides or faces $b'$ if desired, as said elements are employed merely for the purpose of strengthening the block and facilitating its application to the bar.

A forwardly projecting lug $b^3$ is cast integral with each supporting block through which transverse holes are formed to receive the wheel journals $c$, said lugs embracing said journals at points midway between their ends. The outer projecting ends of said journals $c$ receive and support the wheels $d$. As a good and sufficient support for the inner ends of said journals, I have provided additional supporting blocks $e$, which are securely bolted to the vertical portion of the bar $a$, upon the upper ends of which are formed flanges $e'$ which overlap the upper edge of said bar, and upon the front sides of said supporting blocks, lugs $e^2$ project, having transverse holes through them, which receive the inner ends of the wheel journals. The bolts which secure such supporting blocks $e$ to the bar $a^3$, likewise pass through the inner ends of the wheel journals to additionally secure them in place.

Upon the interior of the hubs $d'$ of the wheels $d$ a series of teeth are formed, the opposite faces of which are formed alike, so that said wheels may be transposed when desired, as will be observed and the faces of said teeth are concaved.

Two rock shafts $f, f$, made alike, are supported in bearings in parallelism with the bar $a^3$, and adapted to be rotated on an axis in parallelism with the axis upon which said bar $a^3$ is turned. Each rock shaft consists of a rod or bar bent at each end at right angles with relation to the main portion or body thereof, as at $f', f^2$, but projecting in opposite ways. Bearings are provided for each end of each rock shaft which consist of lugs $b^4$, cast integral with the end supporting blocks, and also of lugs $b^5$ cast integral with blocks $b^6$, which are securely bolted to the vertical portion of the bar $a^3$, near the middle, and the lugs or ears $a^2$ which are bolted to the bar $a^3$, are formed with short vertical extensions $a^5$, which terminate adjacent the rock shafts, and furnish additional bearings therefor at points between their ends. The outer right angular ends $f'$ of the rock shafts constitute pawls which are adapted to engage the internal teeth in the hubs $d'$, and the acting faces of said pawls are made slightly convex see Fig. 7 to enter the concavities in the faces of the teeth of the hub. These concavities receive and hold the pawl in such a manner that it is not liable to slip off and become accidentally disengaged by any sudden shock or jar. The opposite or adjacent right angular ends $f^2$ of said rock shafts are confined within a box or casing $g$ herein shown as made in two parts, securely bolted together, said box or casing being supported by the rock shafts. Each part of the box or casing is recessed to receive the right angular ends $f^2$, as well as a short portion of the horizontal rock shaft $f$ as shown in Figs. 2, 4 and 5, said recesses however increasing in depth toward the upper end of the box or casing, see Fig. 4, so that a limited amount of play is permitted for said ends $f^2$. The upper or rearmost part of the box or casing $g$ is also recessed to receive two short spiral springs $s$, adapted to exert their pressure upon the extremities of said end portions $f^2$. When the pawls $f'$ are thrown into engagement with the teeth of the hubs $d'$ of the wheels, and one of said wheels turns slower than the other, or for any other reason, one or both of the pawls should slip by or over the teeth $d^2$, the ends $f^2$ will move in the recesses provided for them within the box $g$, against the pressure of the springs $s$. It will be seen that by forming like right angular ends on the rock shafts $f$ as shown, projecting in opposite ways, they may be turned end for end at any time desired, the portions $f^2$, serving as pawls, and the portions $f'$, being confined within the casing and receiving the pressure of the springs $s$. Upon the under or front side of said box or casing $g$ a suitable extension $g'$ is formed to which is connected a rod or bar $g^2$, the opposite end of which is connected with a bell-crank foot lever $g^3$, pivoted to a stand on the draft frame $a$, so that by depressing said foot lever, the box or casing $g$ will be turned in the direction of the arrow Fig. 4, thereby throwing the pawls $f'$ of the rock shafts into engagement with the internal teeth of the hubs $d'$. A pin $h$ is loosely connected at $h'$ to the extension $g'$, which extends rearwardly, passing through a hole in the vertical portion of the bar $a^3$, and a spiral spring $h^2$, encircles said pin, bearing at the rear end against the bar $a^3$, and at the forward end against a shoulder $h^3$ on the pin, the tendency of which is to retain the casing $g$ in its normal position, or restore it to its normal position when the pressure upon the foot lever is relieved.

The rake teeth $m$ are suitably secured to the horizontal portion of the bar $a^3$ by clips $m'$ bolted to said bar, and hence said bar $a^3$ constitutes the rake head.

When it is desired to raise the teeth for dumping or for any other purpose, the foot lever $g^3$, is depressed, turning the box or casing $g$ and throwing the pawls $f$ into engagement with the internal teeth of the hubs $d'$, and as the wheels $d$ revolve, the bar $a^3$ will be rotated until the end of the extension $g'$ on the box $g$ strikes a fixed stop on the stripper bar $n$, or it may be the bar itself, at which time said casing $g$, is restrained from further rotation, and the wheels continuing to revolve the pawls $f'$ will be immediately disengaged from the teeth within the hubs $d'$. The parts then resume their normal position. The stripper bar $n$ is also made of angle iron, L-shaped in cross section, and bolted to the extremities of the draft frame $a$, and also to the extremities of the shafts $o$, which shafts extend forward above and are bolted to the draft frame $a$. The stripper arms $n'$, are secured to the horizontal portion of said bar $n$ by clips $n^2$, which are bolted to said bar.

An additional foot lever, $p$, and hand lever $p'$, preferably connected together in usual manner, are supplied for raising the rake head when desired.

To give additional strength to the stripper arms $n'$ as well as to enable them to remove the hay from the rake teeth, a horizontal connecting rod or bar $n^3$ is secured to said arms by clips $n^4$, see Fig. 6, which embrace the stripper arms $n'$, and are bolted to the cross bar.

The entire rake thus described may be made of metal, although it is preferable to make the shafts $o$ of wood. The said rake is light and durable, easily operated, and also easily repaired in case of accidental breakage of any of the parts.

I do not desire to limit my invention to the precise construction of the different parts, as it is obvious that they may be changed in construction or form, and yet accomplish the same results.

I claim—

1. In a horse rake, a rolling rake head, wheel journals, and wheels, and an internally toothed hub $d'$, combined with a reversible rock shaft $f$ turning on an axis in parallelism with the axis of the rake head, having like right angular ends $f'$, $f^2$, a sectional box or casing $g$ recessed to receive either right angular end while the other acts as a pawl to engage the teeth of the hub $d'$, and a foot lever connected with and adapted to move said box or casing, substantially as described.

2. In a horse rake, a rolling rake head, wheel journals, and wheels, and an internally toothed hub $d'$, combined with a rock shaft $f$ turning on an axis in parallelism with the axis of the rake head, having right angular ends $f'$, $f^2$, the box or casing $g$ confining one of said ends while the other acts as a pawl to engage the teeth of the hub $d'$, a tapering recess in said box or casing $g$, permitting limited movement of the right angular end confined therein, and a foot lever connected with and adapted to move said box or casing, substantially as described.

3. In a horse rake, a rolling rake head, wheel journals, and wheels, and an internally toothed hub $d'$, combined with a rock shaft $f$ turning on an axis in parallelism with the axis of the rake head, having right angular ends $f'$, $f^2$, the box or casing $g$ confining one of said ends while the other acts as a pawl to engage the teeth of the hub $d'$, a tapering recess in said box or casing $g$ permitting limited movement of the right angular end confined therein, a spring bearing upon said confined right angular end, and a foot lever connected with and adapted to move said box or casing, substantially as described.

4. In a horse rake, a rolling rake head, wheel journals, and wheels, and an internally toothed hub $d'$, combined with a rock shaft $f$, turning on an axis in parallelism with the axis of the rake head having a pawl at the end which co-operates with the toothed hub $d'$, the box or casing $g$, connected with the opposite end of said rock shaft, an extension $g'$ thereon, and a fixed stop against which it strikes to limit the rotation of the rake head, and disengage the pawl from the hub $d'$, and a foot lever connected with and adapted to move said box or casing, substantially as described.

5. In a horse rake, a rolling rake head, wheel journals, and wheels, and an internally toothed hub $d'$, combined with a rock shaft $f$ turning on an axis in parallelism with the axis of the rake head having a pawl at the end which co-operates with the toothed hub $d'$, the box or casing $g$, connected with the opposite end of said rock shaft, an extension $g'$ thereon, and a fixed stop against which it strikes to limit the rotation of the rake head, and disengages the pawl from the hub $d'$, and the restoring spring $h^2$, and foot lever connected with and adapted to move said box or casing, substantially as described.

6. In a horse rake, a rolling rake head bearing at each end wheel journals, wheels thereon, having internally toothed hubs $d'$, combined with two rock shafts $f$, $f$, arranged in alignment and turning on an axis in parallelism with the rake head, and having at each end right angular ends $f'$, $f^2$, a box or casing $g$ confining the adjacent right angular ends while the opposite ends act as pawls to engage the internally toothed hubs, springs acting upon said confined right angular ends, a foot lever for moving said box or casing to throw the pawls into engagement with the toothed hubs, and means for limiting the rotation of the rake head and disengaging the pawls, substantially as described.

7. In a horse rake, and in combination with a rolling rake head, wheels and journals therefor, and a toothed hub, of a rock shaft turning on an axis in parallelism with the axis of the rake head, having like right angular portions at each end, whereby its position may be reversed, and either end serve as a pawl to engage the teeth of said hub.

8. In a horse rake, and in combination with a rolling rake head, wheels and journals therefor, and a toothed hub, of a rock shaft turning on an axis in parallelism with the axis of the rake head, bent at each end at right angles with relation to the shaft and in opposite directions to form like right angular portions at each end of the shaft, either of which may be used as a pawl to engage the teeth of said hub.

9. In a horse rake, the combination of the rolling rake head, wheels, and journals therefor, and a toothed hub, a rock shaft turning on an axis in parallelism with the rake head, having at its outer end a pawl adapted to engage said toothed hub, and having at its inner end a right angular portion, a sectional box or casing chambered to confine and permit a limited movement therein of said right angular end portion, and means for moving said box or casing to thereby rock the shaft, substantially as described.

10. In a horse rake, the combination of a rolling rake head, wheels, journals therefor, and a toothed hub, a rock shaft turning on an axis in parallelism with the rake head, having at its outer end a pawl adapted to engage said toothed hub, and having at its inner end a right angular portion, a sectional box or casing chambered to confine and permit a limited movement therein of said right angular end portion, a spring bearing upon said confined right angular end, and means for moving said box or casing to thereby rock the shaft, substantially as described.

11. In a horse rake, a rolling rake head, wheels and journals therefor, and toothed hubs, combined with two independent shafts having pawls at their outer ends adapted to engage said toothed hubs, the inner ends of which terminate adjacent to each other, a box confining and permitting a limited independent movement of said inner ends, a foot lever for moving said box to thereby in turn operate said pawl-carrying shafts, substantially as described.

12. In a horse rake, a rolling rake head, wheels and journals therefor, and toothed hubs, combined with two independent shafts, having pawls at their outer ends adapted to engage said toothed hubs, the inner ends of which terminate adjacent to each other, a spring acting upon the inner end of each pawl-carrying shaft, tending to throw the pawl thereof into engagement with the teeth of the hub, a box confining said inner ends of the shafts and also the pressure springs, and means for moving said box to operate the shafts and bodily move the pressure springs, substantially as described.

In testimony whereof I have signed my name to this specification in the presence of two subscribing witnesses.

CHARLES S. SHARP.

Witnesses:
W. H. HARRIS,
GEO. E. CRONKRIGHT.